US011224229B2

(12) United States Patent
Van De Nieuwelaar et al.

(10) Patent No.: US 11,224,229 B2
(45) Date of Patent: Jan. 18, 2022

(54) METHOD FOR MANUFACTURING SAUSAGE PRODUCTS, SAUSAGE AND SAUSAGE PRODUCTION

(75) Inventors: Adrianus Josephes Van De Nieuwelaar, Gemert (NL); Marcus Bernhard Hubert Bontjer, Aarle-Rixtel (NL); Léon Marie Francois Spierts, Maastricht (NL); Leonie Petronella Wilhelmina Maria Boons, 's-Hertogenbosch (NL)

(73) Assignee: Marel Further Processing B.V., Boxmeer (NL)

( * ) Notice: Subject to any disclaimer, the term of this patent is extended or adjusted under 35 U.S.C. 154(b) by 896 days.

(21) Appl. No.: 13/519,814

(22) PCT Filed: Dec. 30, 2010

(86) PCT No.: PCT/NL2010/050898
§ 371 (c)(1),
(2), (4) Date: Sep. 6, 2012

(87) PCT Pub. No.: WO2011/087359
PCT Pub. Date: Jul. 21, 2011

(65) Prior Publication Data
US 2012/0321752 A1     Dec. 20, 2012

(30) Foreign Application Priority Data
Dec. 30, 2009     (NL) ....................................... 2004037

(51) Int. Cl.
*A22C 13/00*      (2006.01)

(52) U.S. Cl.
CPC .. *A22C 13/0006* (2013.01); *A22C 2013/0023* (2013.01); *A22C 2013/0053* (2013.01)

(58) Field of Classification Search
CPC ............ A22C 13/0016; A22C 13/0013; A22C 13/0006; A22C 13/0003; A22C 13/00;
(Continued)

(56) References Cited

U.S. PATENT DOCUMENTS

2004/0156977 A1   8/2004   Bocabeille
2005/0064118 A1   3/2005   Damstetter
(Continued)

FOREIGN PATENT DOCUMENTS

DE       4306274 A1       6/1994
JP    2004-530441 A      10/2004
(Continued)

OTHER PUBLICATIONS

Phase behaviour, rheology and microstructure of mixture of meat proteins and kappa and iota carrageenans (Year: 2011).*
(Continued)

*Primary Examiner* — Erik Kashnikow
*Assistant Examiner* — Assaf Zilbering
(74) *Attorney, Agent, or Firm* — Workman Nydegger

(57) ABSTRACT

The invention relates to a method for manufacturing sausage products by means of co-extrusion, wherein the method comprises the steps of: providing a food dough (6); providing a viscous casing mass material (8); and producing by means of co-extrusion a sausage strand (2) with the extrusion of a centre of food dough at least partially provided by layered casing mass material.

24 Claims, 6 Drawing Sheets

(58) Field of Classification Search
CPC ................ A22C 11/00; A22C 2013/00; A22C 2013/0053; A22C 2013/0023; A22C 2013/002
USPC ............................................ 426/105; 452/30
See application file for complete search history.

(56) References Cited

U.S. PATENT DOCUMENTS

| | | |
|---|---|---|
| 2005/0220946 A1 | 10/2005 | Torcatis |
| 2008/0299264 A1 | 12/2008 | Torcatis |
| 2009/0220655 A1* | 9/2009 | Longo Areso ......... A22C 13/00 426/105 |
| 2009/0317522 A1* | 12/2009 | Nielsen et al. ............... 426/138 |
| 2010/0047400 A1* | 2/2010 | Carlson et al. ................. 426/92 |
| 2012/0114807 A1* | 5/2012 | Visser ........................... 426/105 |

FOREIGN PATENT DOCUMENTS

| | | | |
|---|---|---|---|
| JP | 2005-533511 A | | 11/2005 |
| WO | 2000002463 A1 | | 1/2000 |
| WO | WO 0002463 A1 | * | 1/2000 |
| WO | 2006051274 A1 | | 5/2006 |
| WO | 2007032678 A1 | | 3/2007 |

OTHER PUBLICATIONS

Advantages of Whey Protein in MeatsW (Year: 2010).*
Japanese Official Letter and correspondence dated Oct. 11, 2016; Japanese Patent Application No. 2012-547045; Marel Townsend Further Processing B.V.

* cited by examiner

METHOD FOR MANUFACTURING SAUSAGE PRODUCTS, SAUSAGE AND SAUSAGE PRODUCTION

BACKGROUND OF THE INVENTION

The invention relates to a method for manufacturing sausage products by means of co-extrusion, wherein the method comprises the steps of: A) providing a food dough; B) providing a viscous casing mass material; and C) producing by means of co-extrusion a sausage strand with the extrusion of a centre of food dough at least partially provided by a layer of the casing mass material. The invention also relates to a sausage according to such a method and to a production device for the manufacture method.

Originally sausages were produced to preserve and economically use slaughtering products as blood, organs and scraps. There are many sausage varieties, a lot of them not only comprising meat but also comprising, or even composed of, other ingredients such as fish products and/or vegetable products. It is also possible to produce a sausage that is not homogenous; the centre (also referred to as the sausage core) of the sausage may e.g. comprises different dough types. As the growth of worldwide sausages consumption is substantial there is demand for automated sausage production where normally as an alternative for natural casings, which are expensive and difficult to acquire, also the casing is produced in process. A known automated and high volume production method for sausage makes use of a co-extrusion technique. Co-extrusion is realised by means of a co-extrusion means for forming a continuous string of a food product which is provided all around with a substantially uniform casing layer that is extruded in connection with the extrusion of the string (alternative wordings for string are core, strand, centre and rope) of food product. The extrusion means of the string and the extrusion means of casing layer may be incorporated in a single co-extrusion head but may also be physically separated in subsequent extrusion means, however when physically separated both the extrusion means cooperate so that they are jointly/collectively/in relationship operated. Such related and dual extrusion of the string and a casing layer is referred to here as "co-extrusion". The covering layer normally comprises a gel which after co-extrusion has to be subjected to a gelation treatment (e.g. coagulation) to remove a part of the water from the casing material and/or to cross link the casing material so to cause the casing material to solidify and stabilize.

Co-extrusion of sausage is a continuous and efficient production method which however limits the freedom of casing composition and structure to be produced due to e.g. the production demands on ingredients/starting materials, material conditions and processing times.

A general object of the invention is to provide an improved method for manufacturing sausage products by means of co-extrusion as well as a production device that would enhance the design choices of sausage products to be produced with this technique, or with other words that would allow more types of and variations on sausage to be produced with co-extrusion than is to be realised with the prior art automated sausage manufacturing methods. The invention also has the objective to provide new types of sausage products. A further objective is to improve the efficiency of existing coextrusion processes and/or to use new casing materials.

SUMMARY OF THE INVENTION

The present invention provides a method for manufacturing sausage products of the introductorily stated type wherein (the outer surface of) the centre is at least locally provided with plural layers of casing mass material and of which plural layers of casing mass material at least one is at least partially converted to a substantial solid state, e.g. under the influence of the pH applied. In this respect "solid state" is to be understood as shape retaining, that is strong enough to endure mechanical handling, as far as that the sausage after some time can be handled without that at least one of the layers of casing mass material is damaged; the structure of the layer of "solid state" casing mass material is such that the viscosity of that material from the moment of, or shortly after, applying increases. The mere fact that that the outer surface of the centre is at least locally provided with plural layers of casing mass material means that the centre is at least locally covered with plural layers of casing mass material or that at least locally plural layers of casing mass material are applied to the centre. The casing mass material is highly viscous during application of the casing material to the centre and is at that state also referred to as casing paste. The casing mass material may even be liquid prior to and/or during application to the centre. The advantage of a plural layered casing is that this provides extra opportunities in optimising different functional demands in combination with automated sausage production; e.g. demands in relation to casing strength, bite, snap, pre-crimping texture, shelf life, taste, permeability, twisting and/or appearance.

Also new functionality can be provided e.g. by applying a first casing layer that will not, or only partly cure (harden) which first layer is covered by a second casing layer that hardens in time, thus providing a sausage that has a hardened casing which hardened casing may easily be removed form the centre due to the not completely hardened underlying casing layer. Another advantage of such dual structure is that the centre may dry less after production. Plural layers casings may be thinner or thicker than single layered casings. According to the present invention it is thus possible to provide the opportunity to realise a thick layered sausage casing produced with automated sausage extrusion to obtain a higher yield or other product characteristics.

In the situation that during step B) at least two different viscous casing mass materials are provided to produce different layers of casing mass. Both material masses can be optimised for the functions they have to provide. In other words: different casing mass material layers can provide for different functions without the need to combine plural, probably even conflicting, functions in a single casing mass material layer. An example of such optimising the functions is to provide both alginate and collagen in subsequent layers. Before the present invention the two components were used as a mixture (hybrid) as alginate, different from collagen, provides the opportunity for twisting after passing a salt bath but alginate dissolves in time due to contact with phosphate given off by the centre of food dough and alginate doesn't provide the sausage with the required bite. As a mixture it requires sub-optimising of the functions provided to the sausage by the alginate and the collagen. Now the present invention provides the opportunity to optimise the effects sought for from both the alginate and the collagen casing layers without the need to physically mix the two substances.

Another possibility of the separating of different casing layer functions is that it can provide an opportunity to reduce the ingredient costs of the casing material. Of the casing mass materials at least one may comprise water and hydrocolloids such as collagen and/or an alginate to provide a well known casing layer while another casing material layer may be of any edible (for example vegetable or milk protein) composition.

In a specific embodiment it is possible to use a casing mass material blend comprising muscle tissue and/or fat. When muscle tissue or fat is used as a casing mass it is particularly preferred if this mass is sandwiched between a first casing layer and a third casing layer. Which first and third casing layer preferably comprise co Hagen. Most preferably the amount of collagen used in such casing layers is between 0, 1 wt % and 6 wt %. This way the ion-exchange from the food dough to the outer (i.e. third casing layer) is considerably reduced. It is also possible to use different ingredients such as flavours and herbs in the different collagen comprising casing layers.

In another embodiment of the method according to the invention a first casing layer comprises animal or vegetable proteins, preferably between 0.1 wt % and 6 wt % and more preferably albumine or chicken egg proteins. A second (outer) layer comprises alginate, preferably 0.1 wt % to 6 wt % alginate.

It is particularly preferred when the first casing layer comprising proteins, also comprises a calcium salt that is poorly soluble in water. Due to the relatively slow release of calcium ions from the first casing layer to the second casing layer comprising alginate a longer shelf-life and better baking properties are obtained. It is particularly preferred to use one or more of the following calcium salts: calcium carbonate, calciumcitrate, calcium oxide, calcium phosphate, calcium silicate, calcium sulphate, calcium sulfide, calcium tartate or mixtures thereof.

Other ingredients for the casing mass material that may be used and that comprise film forming qualities are e.g. polysaccharides, like alginate, pectin, carrageens and/or chitosan; as well as proteins, like gelatine, collagen, water soluble proteins, egg white protein, soy protein, casein or fractions/peptides of these proteins, wheat gluten, corn zein, whey protein and/or pea protein. Specially favourable is a combination of alginate and chitosan. Yet a further option is the use of water soluble cellulose ethers possessing film forming properties, like methylcellulose (MC), hydroxypropylcellulose (HPC), hydroxypropylmethylcellulose (HPMC), and/or carboxymethylcellulose (CMC). An even further alternative is to add plasticisers to the biofilms; examples are polyethyleneglycol (PEG), sorbitol and/or glycerine. As the list of additives to the casing material is almost infinite also surface active materials like emulsifiers may be added e.g. to improve wetting and/or adhesive properties. The different ingredients require different methods for film forming. E.g. cellulose ethers require casting and evaporation of water while proteins can be denaturated by heat and further crosslinked with enzyme and/or a crosslinking agent. Polysaccharides like alginate and carrageenan (kappa and iota) are able to form gels in the presence of calcium (carrageenan also in the presence of potassium).

According to the invention, the options for using different casing material compounds increase, now not all functionality that is demanded from a sausage casing has to be provided by a single casing mass material blend. Also two or more different casing material compounds can influence each others functionality.

Another resulting option is for instance to add a casing mass material layer that visibly changes when heated to a certain degree e.g. to indicate a sausage is heated enough for safe consumption without having to provide any other functions relating strength, bite or permeability or the casing could be designed to change in appearance dependent on temperature or shelf life.

In a specific implementation of the method for manufacturing sausage products as disclosed in this application at least one of the layers of casing mass material is actively transformed to an at least partially solid state. Such active transformation may be realised by chemical, enzymatic, electrical, thermal and/or physical treatment of at least one of the casing mass material layers at the moment this is required during or after manufacturing. An advantage of active transformation is that this provides the opportunity to shorten the total processing time enabling e.g. a better quality assurance and a limitation of the space and process equipment required. However as an alternative it is also possible to transform a casing mass material layer inactively, that means by just letting time pass.

In yet another realization of the method according the present invention the sausage strand is guided through a fixing bath, whereby at least one of the layers of the casing mass material is at least partial converted to a solid state. The fixing bath will enable an active and quick increase of the cohesion of especially the (at that moment in processing) outer layer of the casing mass material.

After the at least partial conversion to a solid state of at least one layer of casing mass material the sausage strand may be subdivided in individual products. The individual products may be cut free of each other but also may still be linked/connected after individualising e.g. by individualising the sausages by twisting. The individualising helps the further processing, logistics and sales of the sausage.

During the manufacturing method according the present invention also a structure improver may be added to casing mass material during step B) or C). Such a structure improver may comprise one or more chemical, biochemical, enzyme and/or mechanical (e.g. fibre) additives. Using a structure improver may accelerate the hardening of at least one of the casing mass material layers and/or provide extra functionality (e.g. appearance, colour, strength, shape). The plural casing material layers also enable the embedding of an additive in between two layers of casing mass material layers. In a further implementation of the claimed method at least one of the layers of casing mass material is removed from the sausage strand later in the process. Such temporary casing layer may be used to further enhance the opportunities in design and/or composition of the sausages produced. The removal of at least one casing mass material layer may be realised from the individualised sausages or earlier in the process before the sausages are individualised. The layer may be removed by e.g. peeling, washing, chemical treatment, solubilisation, enzyme treatment, electrical treatment and/or evaporation. Another option is that plural casing mass material layers are fused during the manufacture of the sausage or later and that thus the plural layered casing converts to a single casing mass material layer. In certain situations it may be preferred to remove a casing layer, e.g. through pealing off this layer. In such situations the plural layers were for example only required during the manufacture, e.g to speed up processing, to enable thicker casings, for protection or other reasons. An intermediate layer of casing material (that is a layer between the centre of food dough and an exterior layer of casing mass material) may be chosen such that easy release of (at least part of) the casing is facilitated or, just the opposite, to prevent such easy release of (at least part of) the casing by increasing the adhesion of the casing and the centre of food dough, depending on the requirements of the sausage production process in use. The properties of the intermediate layer of casing material may be influenced to obtain the release specifications of (at least part of) the casing as desired.

As already mentioned before at least one of the layers of casing mass material is converted to a substantial solid state. This implies that it is also an option that the state of at least one of the layers of casing mass material is not converted. The handling requirements of the casing mass material can be provided by one layer (or more layers) that convert to another state but this also provides the opportunity to preserve the original state of the casing mass material of at least one other layer of casing mass material.

It is also possible that at least one of the layers of casing mass material is applied discontinuously over the length of the sausage strand. Such discontinuous applying of at least one of the layers of casing mass material may also favourably be synchronised with a later subdividing of the sausage strand in individual products. The discontinuous applying of at least one of the layers of casing mass material provides plural new opportunities in sausage manufacturing. So is it possible to provide different functionality on different positions of an individualised sausage, e.g. the ends that have to be compressed during the individualising step may be made of a different casing mass composition than the sausage part in between the sausage ends. Another option is to provide additional visual information. An example of such visual information is the provision of "portioning indications" (e.g. outlined rims) or artificial "grill marks" to enhance the product identity.

The extrusion of a centre of food dough and the application of a first layer of casing mass material may take place at the same moment, e.g. within less than 1 second preferably within less than 0.5 second or even more preferred less than 0.2 seconds in between. Such combined production of the centre and the first layer of casing mass material shortens the total process time leading to the advantages as already mentioned before in relation to shortening the production time. The first one or more layers of casing mass material may also be applied by extrusion like the centre is extruded; this may even be realised in a single dual extrusion head. However there are also other production techniques that may be used to apply the first (and subsequent) layers of casing mass material, such alternative application techniques e.g. are spraying, sprinkling, dipping and bathing. In practise a favourable technique could be to extrude the first layer of casing mass material and to lead the semi-product subsequently through a spraying station or a bath. Also actively controlled jet systems may be used to apply casing material. Such actively controlled jet systems may be combined with electrostatic adhering of the casing material. The advantages of actively controlled jet systems is that they enable optimising the expenditure of casing material and that they enable the local diversification of thickness of a casing material layer, even such that patterns in the casing material layer may be introduced. Instead of sequential layer application also plural layers may be applied simultaneously. To realise a stable product in a preferred manufacturing method the centre of food dough is provided with a least one layer of casing mass material that is treated for converting viscous casing mass material to a more solid state before a subsequent layer of casing mass material is applied. Such treatment may be a thermal treatment (e.g. heating and/or cooling) or drying.

The present invention also provides a sausage product manufactured with a method as disclosed above, comprising an extruded centre of food dough that is at least locally covered with plural layers of casing mass material of which plural layers of casing mass material at least one is converted to a substantial solid state. The advantage of and the opportunities such sausage offer will be further explained later in this text in relation to the attached figures.

In a preferred embodiment the extruded centre of food dough of the sausage product is at least locally provided with a layer of casing mass material comprising muscle fibre and a subsequent layer of casing mass material comprising at least one of the components collagen and alginate. Such a sauge product is provide with an artificial casing that has properties that resemble the properties of a natural casing, e.g. in adhesion to the centre and bite/snap properties.

Furthermore the present invention also provides a production device for the manufacture of sausage products with the method as explained, comprising: a food dough supply; at least two supplies for viscous casing mass material; an extrusion head for the extrusion of a sausage strand forming a centre of food dough, first application means for the application of a first layer of casing mass material; and additional application means for the application of at least locally one or more subsequent layers of casing mass material, wherein at least one of the first application means and the additional application means for casing mass material comprises casing mass material extrusion means. The extrusion head for the extrusion of a sausage strand and a first extrusion means for a first casing mass material layer may be combined in a single device, for example a co-extrusion head. In case the production device comprises plural casing mass material extrusion means a plurality of (probably all) the casing mass material layers may be applied by extrusion.

In a specific embodiment such production device further comprises means for individualising sausage products from a sausage strand and/or the additional application means for casing mass material comprises subsequent extrusion means. For the advantages of such production device reference is made to the advantages as clarified in relation to the related method according the present invention.

BRIEF DESCRIPTION OF THE DRAWINGS

The invention is further elucidated on the basis of the non-limitative exemplary embodiments shown in the following figures. Herein.

DETAILED DESCRIPTION OF THE PREFERRED EMBODIMENTS

Figure 1:
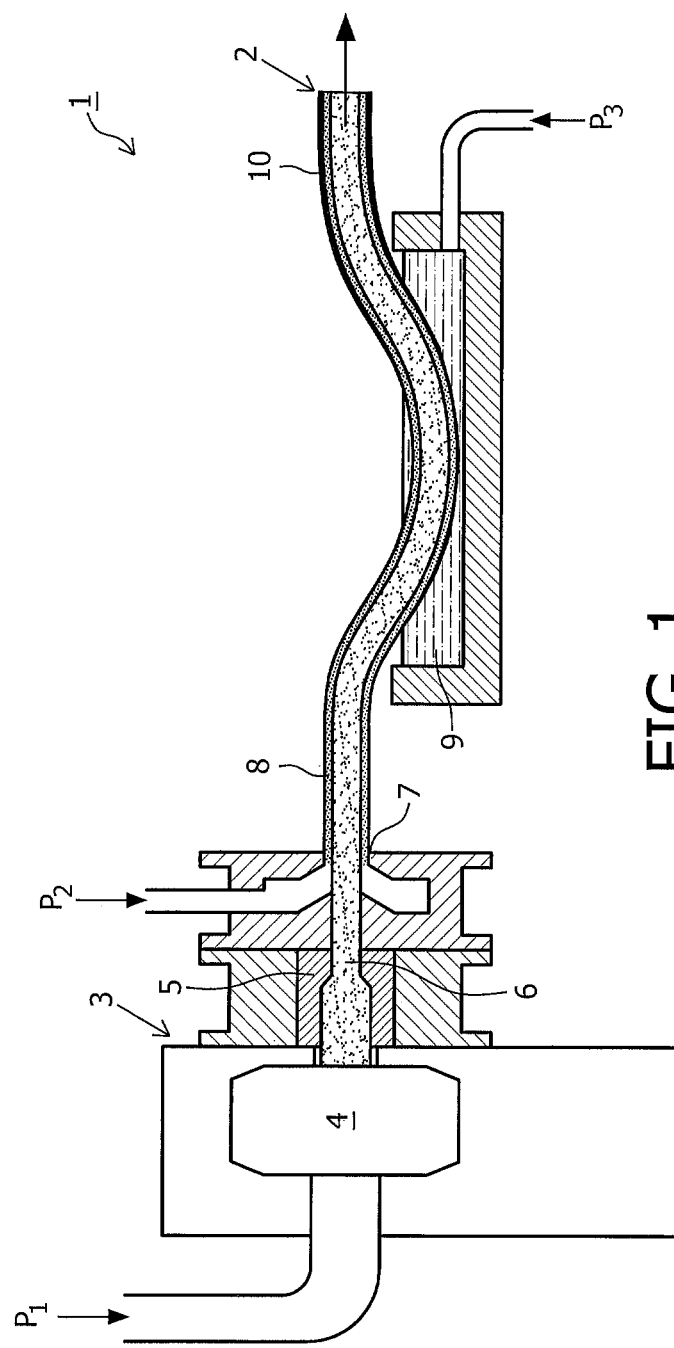
FIG. 1 shows a schematic cross-section through a production device to manufacture sausage products with a method according to the invention.

FIG. 1 shows a cross-section through a production device 1 to manufacture a multilayered sausage product 2. A food dough is fed (see arrow P1) through a pipe to a co-extrusion head 3 wherein a pump 4 presses the food dough through an extrusion aperture 5 thus generating a centre of food dough 6. In a subsequent step in the coextrusion head 3 a casing mass material is fed (see arrow P2) to a rotating disc 7 to extrude a first casing mass material layer 8 covering the centre of food dough 6. The centre of food dough 6 covered with the first casing mass material layer 8 is subsequently guided through a casing material bath 9 that is fed with a second type of casing mass material (see arrow P3) resulting in a second casing mass material layer 10 that is placed on top of the first casing mass material layer 8. The final sausage product 2 has thus a centre of food dough 6 that is over all covered with two layers of casing mass material 8, 10.

Figure 2:
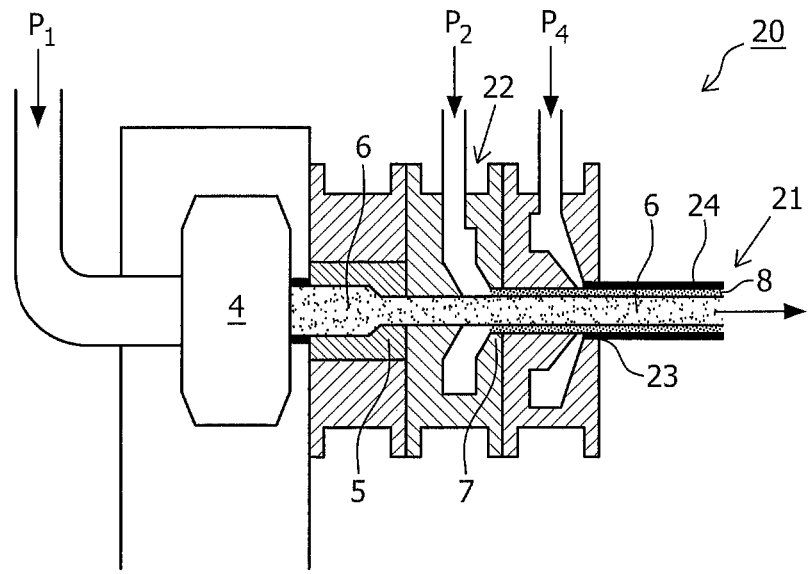
FIG. 2 shows a schematic cross-section through an alternative embodiment of a production device to manufacture sausage products with a method according to the invention.

FIG. 2 shows a schematic cross-section through an alternative embodiment of a production device 20 to manufacture a multilayered sausage product 21 through triple extrusion. Corresponding components with the production device 1 as shown in FIG. 1 are designated with the same reference numerals. The food dough here is fed (see arrow P1) through a pipe to a double co-extrusion head 22 wherein a pump 4 presses the food dough through an extrusion aperture 5 thus generating a centre of food dough 6. As also disclosed in FIG. 1 in a subsequent step a casing mass material is fed (see arrow P2) to a rotating disc 7 to extrude a rrrst casing mass material layer 8 covering the centre of food dough 6. The centre of food dough 6 covered with the first casing mass material layer 8 is subsequently passing a second rotating disc 23 to extrude a second casing mass material layer 24 (fed according to arrow P4) covering the first casing mass material layer 8. Again the final sausage product 21 has thus a centre of food dough 6 that is over all covered with two layers of casing mass material 8, 24, the second casing mass material layer 24 covering the first casing mass material layer 8.

Figure 3:
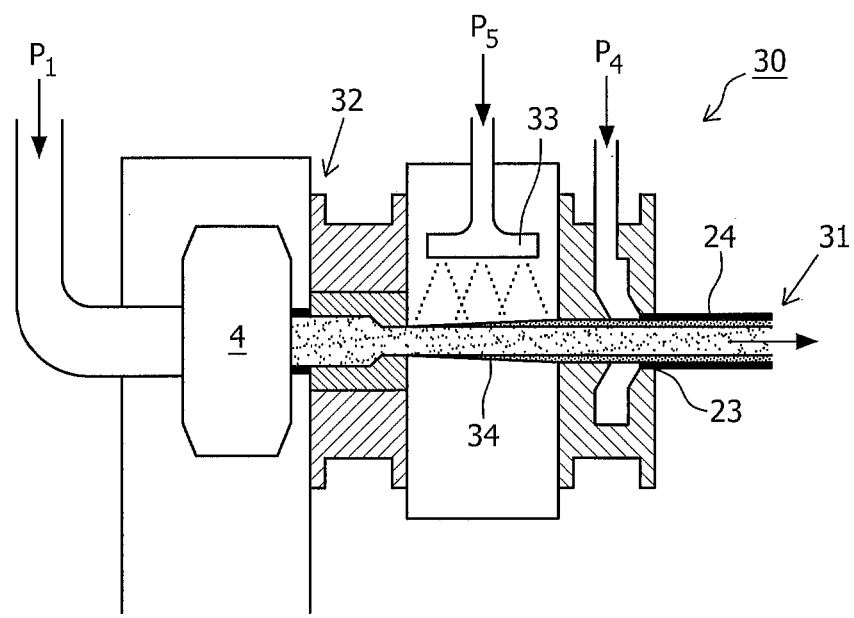
FIG. 3 shows a schematic cross-section through an second alternative embodiment of a production device to manufacture sausage products with a method according to the invention.

FIG. 3 shows a schematic cross-section through an alternative embodiment of a production device 30 to manufacture a multilayered sausage product 31. Again corresponding components with the production devices 1, 20 as shown in FIGS. 1 and 2 are designated with the same reference numerals. The food dough is fed (see arrow P1) through a pipe to a extrusion head 32 wherein a pump 4 presses the food dough through an extrusion aperture 5 thus generating a centre of food dough 6. Different for the previously shown production devices 1, 20 in a subsequent step a casing mass material is fed (see arrow P5) to a shower head type nozzle 33 applying a first casing mass material layer 34 covering the centre of food dough 6. The centre of food dough 6 covered with the first casing mass material layer 34 is subsequently passing a rotating disc 23 to extrude a second casing mass material layer 24 (fed according arrow P4) covering the first casing mass material layer 34. As shown before also this final sausage product 31 has a centre of food dough 6 that is over all covered with two layers of casing mass material 34, 24, the second casing mass material layer 24 covering the first casing mass material layer 34.

Figure 4A:
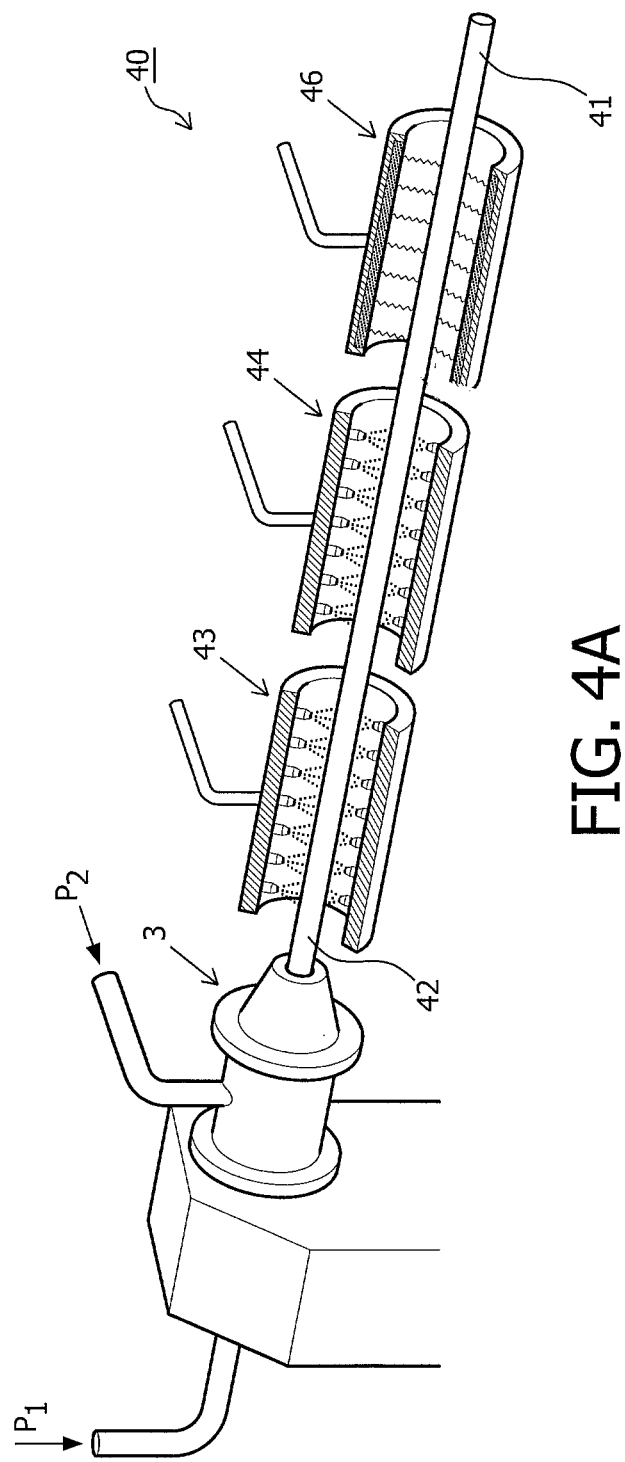
FIG. 4A shows a perspective partly cut away view of a third alternative embodiment of a production device to manufacture sausage products with a method according to the invention.

FIG. 4A shows a production device 40 to manufacture a three-layered sausage product 41 using a co-extrusion head 3 as in more detail explained in relation to FIG. 1. However multilayered products may also be produced with a triple-extrusion head or even an extrusion head extruding a core and three or more casing layers (with a quartoextrusion head or an even higher extrusion layer count head. The food dough (P1) and the first type of casing mass material (P2) are fed to the co-extrusion head 3. This coextrusion process results as explained (see description relating FIG. 1) in a semi-manufacture 42 (comprising a centre of food dough 6 covered with the first casing mass material layer 8). The semi-manufacture 42 is subsequently guided through a first spraying device 43 spraying a second type of casing mass material on the semimanufacture 42. After leaving the first spraying device 43 the food strand is then guided through a second spraying device 44 spraying a third type of casing mass material (e.g. for fixation) to provide a third casing mass material layer. The three-layered food strand 41 then passes an induction unit 46 for at least partially solidifying one of the casing mass material layers that enables further handling of the three-layered food strand 41.

Figure 4B:
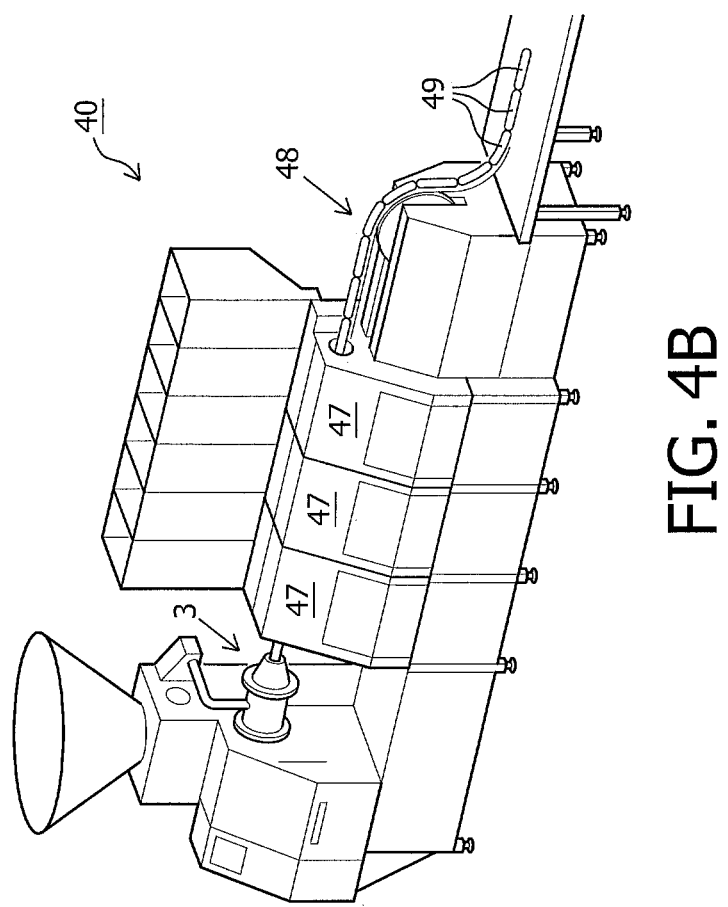
FIG. 4B shows a perspective external view of the third alternative embodiment of the production device to manufacture sausage products partially shown in FIG. 4A.

FIG. 4B shows an external view of the production device 40 as elucidated in FIG. 4A. The co-extrusion head 3 connects to three cabinets 47 holding the spraying devices 43, 44 and the induction unit 46. In line of production behind the last cabinet 47 that holds the induction unit 46 is shown a singulation device 48 to individualise sausage products 49 from the three-layered sausage strand 41.

Figure 5A:
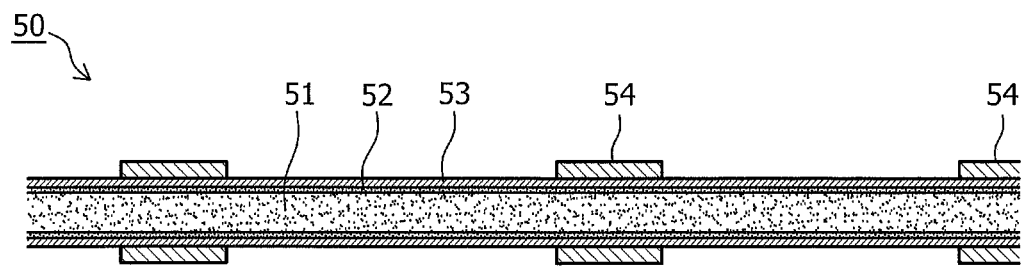
FIGS. 5A-5E show various cross sections and perspective views of sausage products manufactured with a method according the present invention.

FIG. 5A shows a schematic cross section through a sausage strand 50 according to the present invention wherein a centre of food dough 51 is covered with two casing mass material layers 52, 53. Upon an outer casing mass material layer 53 casing mass material layer parts 54 are applied intermittently and locally. The casing mass material layer parts 54 may be applied for strengthening the sausage strand 50 locally where the stand is separated later in the process for individualisation of sausage products or for providing markings (e.g. portioning marks for the end user or other customer convenience).

Figure 5B:
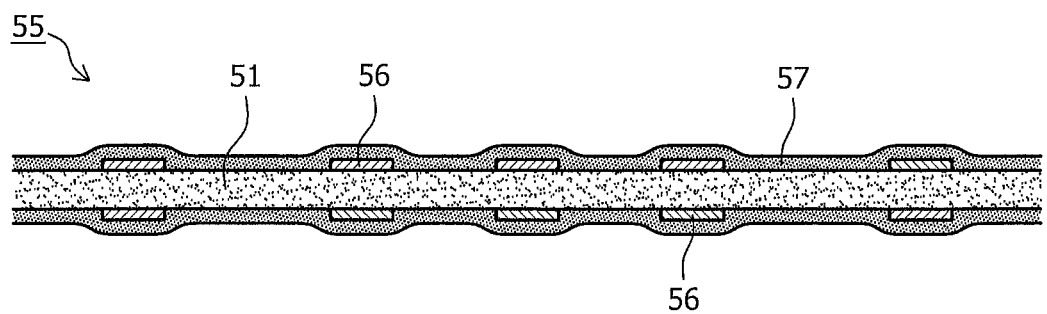

FIG. 5B shows a schematic cross section through an alternative sausage strand 55 according to the present invention wherein the centre of food dough 51 (as before corresponding elements with the sausage stand 50 as shown in FIG. 5A are designated with the same reference numerals) is now first partially covered with casing mass material layer parts 56, as well as over the layer parts 56, subsequent casing mass material layer 57 is applied.

Figure 5C:
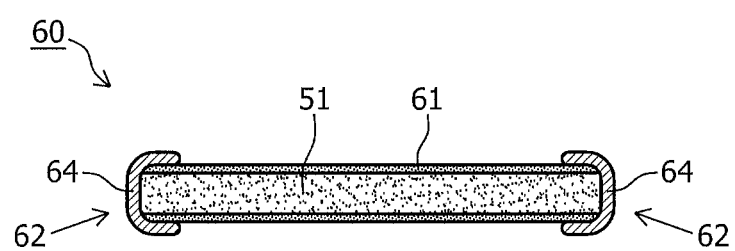

FIG. 5C shows an individualised sausage 60 with a centre of food dough 51 that is covered with a first casing mass material layer 61 except for the two ends 62, 63 where the separation (individualisation) took place. These sausage ends 62, 63 are however covered by a partial second casing mass material layer 64 that is made out of a different type of casing material mass than the first casing mass material layer 61, and due to the different nature of the second casing mass material layer 64 food dough parts are able to flow and to cover up the parts of the centre of food dough 51 that come free due to the separation.

Figure 5D:
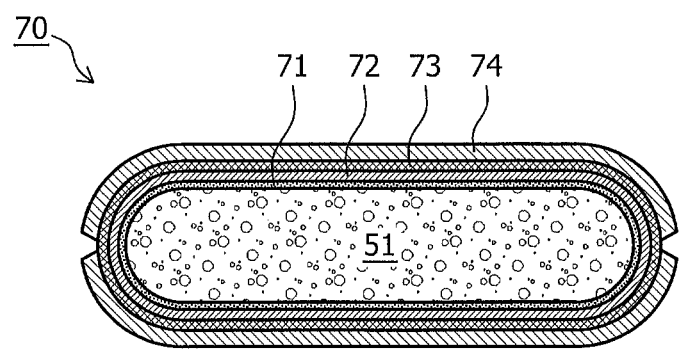

The cross section through the sausage 70 in FIG. 5D shows a centre of food dough 51 covered with a first casing mass material layer 71 that has adhesive properties. A second casing mass material layer 72 comprises, at least for a substantial part of the layer, a seasoning/spicing while a third casing mass material layer 73 is a protective layer until consumption that may partially melt during preparation for consumption. A fourth nonedible casing mass material layer 74 is applied for protection during thermal treatment and is to be removed before consumption. From this sausage 70 is also clear that the casing mass material layers 71, 72, 73, 74 may be of varying thickness. For easy peeling off the non-edible casing mass material layer 74 this layer may be pre-carved and/or provided with punctures. Such punctures may also be useful for other casing mass material layers, e.g. to make them permeable to fluids and/or gasses. Another option is to use the non-permeability of a specific casing mass material layer to deliberately entrap gasses and/or fluids in a sausage product.

Figure 5E:
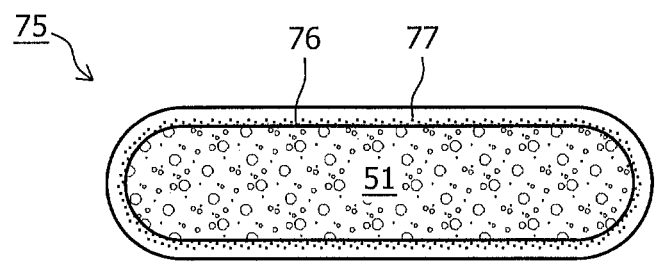

The cross section through the sausage 75 in FIG. 5E shows a centre of food dough 51 that is covered with two casing mass material layer 76, 77, which are fused/melted together after application. The inherent change of one of more non-edible casing mass material layers over time may also be used for changing the shape (e.g. bending) of a sausage product.

What is claimed:

1. A method for manufacturing sausage products by means of co-extrusion, wherein the method comprises the steps of;
   A) providing a food dough;
   B) providing a viscous casing mass material; and
   C) producing by a first co-extrusion means a sausage strand through extruding a center of the food dough at least partially covered by a first inner layer of the viscous casing mass material;
   wherein the center of the food dough is at least locally provided with at least two layers of casing mass material including the first inner layer of the viscous casing mass material, and at least one of said at least two layers of the viscous casing mass material is at least partially converted to a substantially solid state;
   wherein the first inner layer of the viscous casing mass material comprises 0.1 to 6 wt % of proteins
   wherein at least one of the at least two layers of the viscous casing mass material is applied by a non-co-extrusion means and a second outer layer of the viscous casing mass material of the two layers of casing mass material is applied by extrusion through a second co-extrusion means; and
   wherein the first inner layer of the viscous casing mass material is configured to not harden over time and the second outer layer of the viscous casing mass material is configured to harden over time;
   wherein the second co-extrusion means is downstream of the first co-extrusion means.

2. The method according to claim 1, wherein during step B) at least two different viscous casing mass materials are provided to produce the first inner layer and the second outer layer of the casing mass material.

3. The method according to claim 1, wherein one of the at least two layers of the viscous casing mass material comprises water and hydrocolloids such as collagen and/or an alginate.

4. The method according to claim 1, wherein the second outer layer of the viscous casing mass material comprises 0.1 to 6 wt % alginate.

5. The method according to claim 4, wherein the first inner layer of the viscous casing mass material also comprises calcium carbonate, calcium citrate, calcium oxide, calcium phosphate, calcium silicate, calcium sulfate, calcium sulfide, calcium tartrate or mixtures thereof.

6. The method according to claim 1, wherein the first inner layer of the viscous casing mass material comprises collagen, the second outer layer of the viscous casing mass material comprises edible fat or oil, and a third layer of the viscous casing mass material comprises collagen.

7. The method according to claim 1, wherein at least one of the at least two layers of the viscous casing mass material is actively transformed to an at least partially solid state.

8. The method according to claim 1, wherein the sausage strand is guided through a fixing bath, whereby at least one of the at least two layers of the viscous casing mass material is at least partial converted to a solid state.

9. The method according to claim 1, wherein after at least partial conversion to a solid state of one of the at least two layers of the viscous casing mass material the sausage strand is subdivided into individual products.

10. The method according to claim 1, wherein a structure improver is added to the viscous casing mass material during step B) or C).

11. The method according to claim 1, wherein one of the at least two layers of casing mass material is removed from the sausage strand.

12. The method according to claim 1, wherein the state of one of the at least two layers of the viscous casing mass material is not converted.

13. The method according to claim 1, wherein one of the at least two layers of casing mass material is applied discontinuously over a length of the sausage strand.

14. The method according to claim 13, wherein the discontinuous applying of one of the at least two layers of the viscous casing mass material is synchronized with a later subdividing of the sausage strand into individual products.

15. The method according to claim 1, wherein one of the at least two layers of the viscous casing mass material is applied by sprinkling, spraying or bathing.

16. The method according to claim 1, wherein the center of the food dough provided with one of the at least two layers of casing mass material is treated to convert the viscous casing mass material to a solid state before a subsequent layer of the viscous casing mass material is applied.

17. The method of claim 1, wherein the non-co-extrusion means is selected from a group consisting of a bath, an actively controlled jet system, and at least one shower head.

18. A method for manufacturing sausage products by means of co-extrusion, wherein the method comprises the steps of:
   A) providing a food dough;
   B) providing a viscous casing mass material; and
   C) producing by means of co-extrusion a sausage strand through extruding a center of the food dough at least partially covered by a first layer of casing mass material;
   wherein the center of the food dough is at least locally provided with at least two layers of the viscous casing mass material including the first layer of the viscous casing mass material;
   wherein at least one layer of the at least two layers of the viscous casing mass material comprises collagen;
   wherein the first layer of the viscous casing mass material comprises 0.1 to 6 wt % of proteins;
   wherein the first layer of the viscous casing mass material is converted to at least a partially solid state and a second layer of the viscous casing mass material is not converted to a solid state; and
   wherein the first layer of the viscous casing mass material is configured to not harden over time and the second layer of the viscous casing mass material is configured to harden over time.

19. The method of claim 1, wherein first inner layer of the viscous casing mass material is applied by the non-co-extrusion means and the second outer layer is subsequently applied by extrusion.

20. The method of claim 1, wherein the non-co-extruding means comprises at least two distinct spray stages, a first distinct spray stage of the at least two distinct spray stages configured to apply the second outer layer and a second distinct spray stage of the at least two distinct spray stages configured to apply a third outer layer.

21. A method for manufacturing sausages, the method comprising the steps of:
   A) providing a food dough;
   B) providing at least one viscous casing mass material;
   C) extruding a food dough center of a sausage strand through an aperture of a first co-extruder component of a co-extruder; and
   D) providing at least two layers of the at least one viscous casing mass material, a first layer of the at least two layers is sprayed onto the food dough center by a nozzle of the co-extruder, a second layer of the at least two layers is co-extruded onto the food dough center through an aperture of a second co-extruder component;
   wherein the nozzle and the second co-extruder component are located downstream from the first co-extruder component such that the first and second layers are applied onto the food dough center after the food dough center has been extruded from the aperture.

22. The method of claim 21, wherein the second co-extruder component is located downstream from the nozzle, such that the second layer is applied onto the first layer after the first layer has been applied onto the food dough center.

23. The method of claim 21, wherein the second layer comprises collagen.

24. A method for manufacturing sausage products by means of co-extrusion, wherein the method comprises the steps of;
   A) providing a food dough;
   B) providing a viscous casing mass material; and
   C) producing by a first co-extrusion means a sausage strand through extruding a center of food dough at least partially covered by a first inner layer of the viscous casing mass material;
   wherein the center of the food dough is at least locally provided with at least two layers of the viscous casing mass material including the first inner layer of the viscous casing mass material, and at least one of said two layers of the viscous casing mass material is at least partially converted to a substantially solid state;
   wherein the first inner layer of the viscous casing mass material comprises 0.1 to 6 wt % of proteins;
   wherein a second outer layer of the viscous casing mass material of the at least two layers of the viscous casing mass material is applied by extrusion through a second co-extrusion means;
   wherein the first inner layer of the viscous casing mass material is configured to not harden over time and the second outer layer of the viscous casing mass material is configured to harden over time;
   wherein the second co-extrusion means is downstream of the first co-extrusion means.

* * * * *